March 31, 1931.  C. F. PARKER  1,798,554
RACING TRACK
Filed Jan. 18, 1927   2 Sheets-Sheet 1
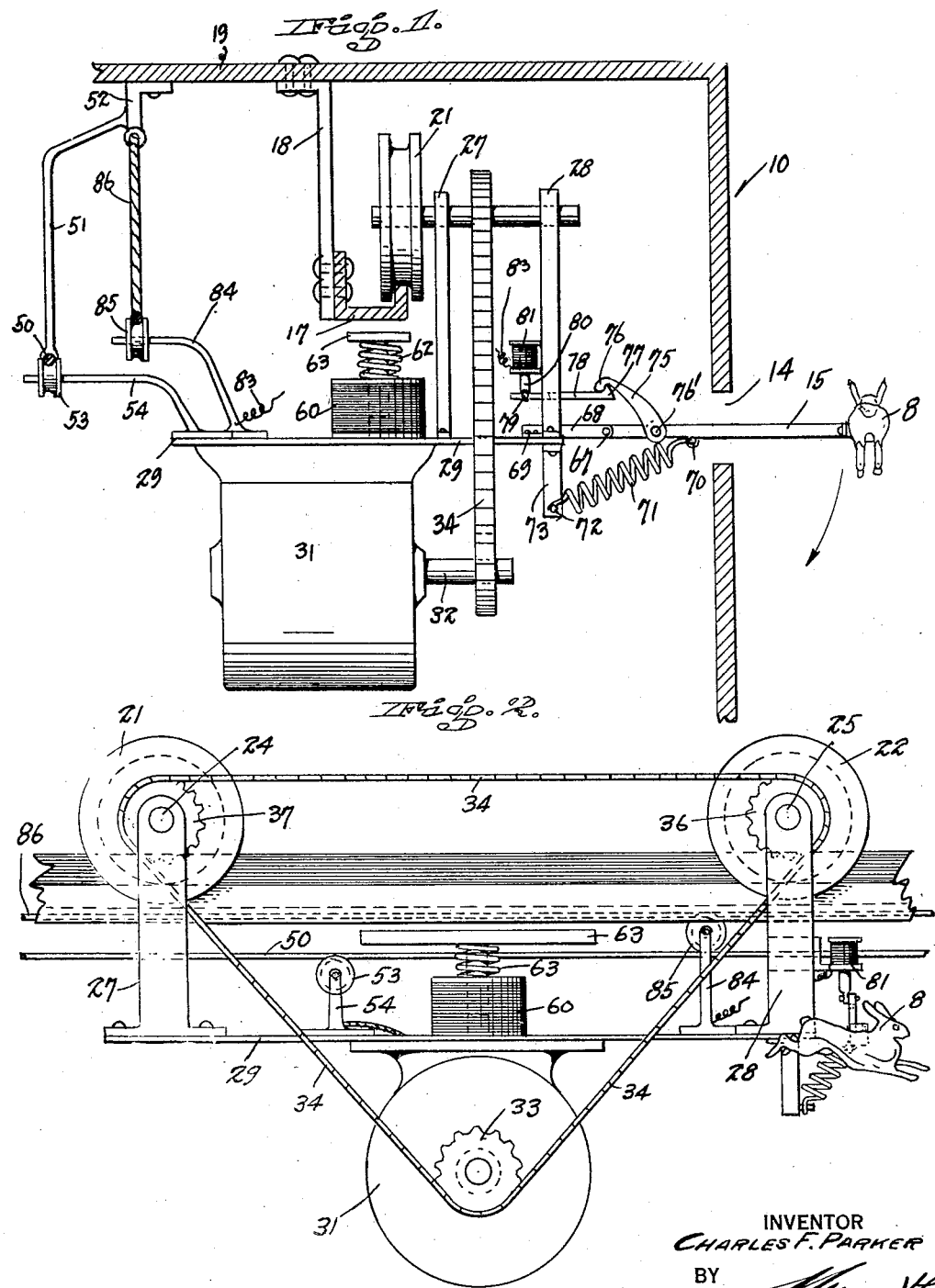
INVENTOR
CHARLES F. PARKER
BY
ATTORNEYS.

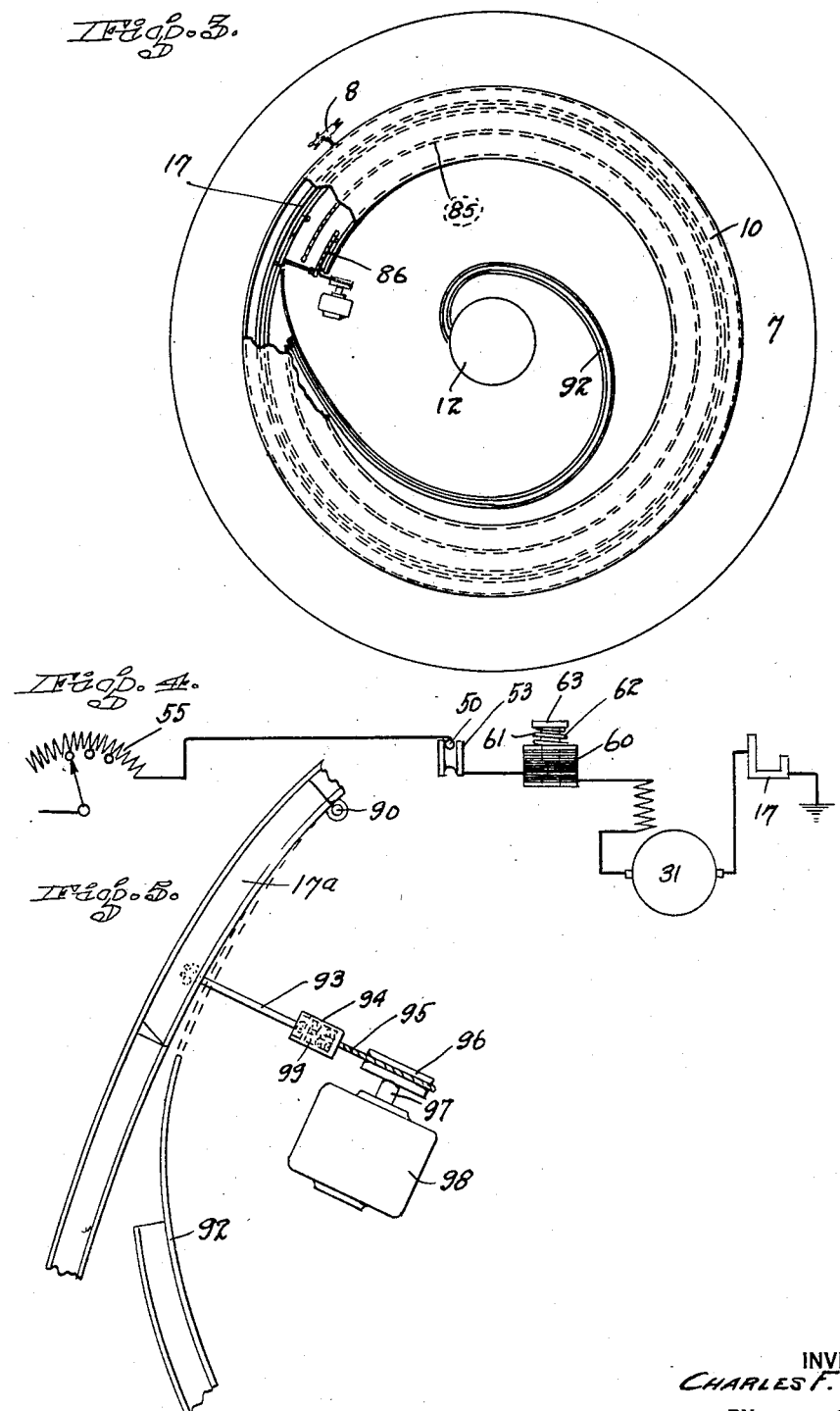

Patented Mar. 31, 1931

1,798,554

UNITED STATES PATENT OFFICE

CHARLES F. PARKER, OF SAN FRANCISCO, CALIFORNIA

RACING TRACK

Application filed January 18, 1927. Serial No. 161,885.

This invention relates to a racing track apparatus, and is particularly valuable in racing of hounds.

An object of the invention is the provision of an apparatus for moving an object such as a rabbit, for example, ahead of the hounds.

With the foregoing object in view, together with such other objects and advantages as may subsequently appear, this invention resides in the construction and arrangement of parts hereinafter described and claimed, and illustrated in the accompanying drawings, in which Figure 1 is a fragmentary vertical section through a housing which encloses the mechanism of my invention;

Figure 2 is a side elevation looking from right to left of Figure 1 with a housing of the latter figure removed;

Figure 3 is a plan view of the structure partly broken away and showing also parts of the mechanism to my invention;

Figure 4 is an electrical diagram employed in the invention; and

Figure 5 is a fragmentary view of a trolley bar including a switch, showing means for pulling the switch from position and showing also a branch trolley bar adapted to be connected up with the switch of the trolley bar.

Referring to the drawings for a more detailed description thereof, the numeral 7 indicates a circular race track over which is made to travel a rabbit 8, concentric with the race track 7 is an annular housing 10. Concentric of the housing 10 is a tower 12, in which an operator is stationed. The housing 10 is provided in its outer wall with an opening 14 so that a bar 15, to which the rabbit is secured, may revolve. The apparatus for moving the rabbit is within the housing.

A trolley bar 17, U-shaped, in cross section, as shown in Figures 1 and 4, is secured by means of a hanger 18 to the top 19 of the housing.

Trolleys 21 and 22 are respectively mounted on shafts 24 and 25. The shafts 24 and 25 are respectively mounted in pairs of standards 27 and 28. The standards 27 and 28 are secured to the member 29, from which depends a motor 31. The motor 31 has a shaft 32 near the end of which is secured a sprocket wheel 33, which engages a chain 34. The chain 34, as clearly shown in Figure 2, engages the sprocket wheels 36 and 37, which are respectively mounted on shafts 25 and 24. It will thus be seen that the running of the motor is effected to make the trolleys 21 and 22 travel over the trolley bar 17. The motor 31 derives its motive power from a trolley wire 50 which is held by arms 51 secured to brackets 52, which are fastened to the underside of the top 19 of the housing 10.

A trolley 53 contacts with the underside of the trolley wire 50 and is mounted on an arm 54 secured to a member 29. The trolley 53 and the arm 54 are electrically connected as shown in Figure 4 with a rheostat 55, which is preferably located in the tower 12 so that it may be manipulated by a person stationed in the tower.

The circuit of the motor 31 as further shown in Figure 4 includes a solenoid 60, having a magnetic core 61, which is urged upwardly by helical spring 62. The top 63 of the magnetic core 61 passes up against the trolley bar 17, where there is a comparatively low current in the motor circuit. The top 63 of the core therefore functions as a brake, inasmuch as it is adapted to pass the trolley bar up against the grooved trolleys 21 and 22.

It will be seen that the circuit includes the trolley plate 17, which is grounded, as shown in Figure 4.

The bar 15 to which the rabbit is secured, is pivoted at 67 to a head 68 secured at 69, to the plate 29, at a point 70, the helical spring 71 is secured to a bar 15, while the other end of the spring is secured at 72 to a bar 73, which depends from the plate 29. A lever 75 is pivoted at 76 to a bar 15 and is provided at its upper end, as shown in Figure 1, with a hook 76 which engages a hook 77 formed on the end of a bar 78, which is pivoted at 79 to a core 80 of an electromagnet 81. The electromagnet 81 forms part of a circuit, which includes a wire 83 electrically connected with an arm 84 on which is mounted a trolley 85, which is in contact with a trolley wire 86. The trolley wire 86 is shown in Figure 3 as being short, it being necessary to energize this trolley wire only when the rabbit is dropped downwardly through an arc as it disappears from the track and through the housing. The circuit, which includes the trolley wire 86, the trolley 85, the arm 84, the conductor 83 and the coil 81, is grounded and includes a switch in the tower 12, from where the switch may be manipulated by the person stationed there. The manipulation of the switch and the consequent action of the mechanism will be described hereinafter.

It will be seen that by controlling the motor 31 from the tower 12 the rabbit may be made to revolve around the track as many times as desired, with the hounds following the rabbit.

The trolleys 21 and 22 riding on the trolley bar 17 and carrying the associated parts, such for example as the standards 27 and 28, the chain 34, the motor 31, the plate 29, the arms 53 and 54, the electromagnet 60, with its brake, the electromagnet 81 with its core 80, the lever 78, the pawl 75, the members 68, the helical spring 71, the arm 15, and the rabbit 8.

After revolving the rabbit as many times as possible around the track, it is desirable to make the rabbit disappear. This is done in the following manner. The motor 31 by means of the rheostat 55, shown in Figure 4, and which by the way may be in the tower 12, is slowed down and with the least current which then runs through the circuit of the motor 31, the magnet 61 is pushed upwardly by the spring 62 until it comes into contact with the trolley bar 17; the helical coil 62 by its pressure against the head 63 of the magnet 61 exerts a braking action to further slow down the motor, and thereby the rabbit, the slowing down of the apparatus should be done before the leading trolley 22 reaches the position 90 shown in Figure 5, where part of the trolley bar 17 is pivoted to its adjoining part so that the pivoted section 17a, which forms a switch may be pulled inwardly to meet the trolley bar 92, which is shown in Figure 3 as being curved, as shown in plan view.

The pivoted section 17a may be pulled inwardly by means of a rod 93 secured to the section and slidably in a fixed casing 94, to the end of the rod 93, which is within a fixed casing 94, is secured a rope 95 which is wound on a pulley 96 mounted on a shaft 97 of a motor 98, the control of which may be in the tower 12. When the apparatus is on the switch section 17a power may be thrown on to the circuit, which includes the trolley wire 86 and the coil 81 having the magnet core 80, the power being in the circuit before 80 is lifted, so that the end 77 of the lever 78 is disengaged from the lever 75, and the arm 15 to which the rabbit is attached, is pulled downwardly and into the housing 10 by means of the coil spring 71. This hides the rabbit from the view of the hounds and the apparatus swings around on the trolley bar 92. The switch section 17a is automatically restored to place by reason of the pressure of a helical spring 99, disposed within the casing 94, and passing on an end of the rod 93.

While I have described one embodiment of my invention, modifications thereof may be readily devised without departing from the spirit of my invention, and it is to be understood that such modifications come within the scope of the appended claim.

I claim:

A racing track comprising an endless rail having a swingable section, a spur track, a spring pressed arm keeping the section in alignment with the remainder of the rail, and electrically controlled means for moving the arm against the compression of the spring for connecting the spur track with the rail.

CHARLES F. PARKER.